(12) United States Patent
McDonald et al.

(10) Patent No.: US 12,214,432 B2
(45) Date of Patent: Feb. 4, 2025

(54) CIRCULAR SAW

(71) Applicant: MILWAUKEE ELECTRIC TOOL CORPORATION, Brookfield, WI (US)

(72) Inventors: Jacob R. McDonald, Ixonia, WI (US); Timothy J. Bartlett, Waukesha, WI (US); Karly M. Schober, Milwaukee, WI (US); Paul W. Eiche, Oconomowoc, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 887 days.

(21) Appl. No.: 17/051,817

(22) PCT Filed: Jul. 23, 2020

(86) PCT No.: PCT/US2020/043166
§ 371 (c)(1),
(2) Date: Oct. 30, 2020

(87) PCT Pub. No.: WO2021/021534
PCT Pub. Date: Feb. 4, 2021

(65) Prior Publication Data
US 2023/0116313 A1    Apr. 13, 2023

Related U.S. Application Data

(60) Provisional application No. 62/878,831, filed on Jul. 26, 2019.

(51) Int. Cl.
*B23D 59/00* (2006.01)
*B23D 45/16* (2006.01)
*B23D 47/12* (2006.01)

(52) U.S. Cl.
CPC ............ *B23D 59/006* (2013.01); *B23D 45/16* (2013.01); *B23D 47/12* (2013.01)

(58) Field of Classification Search
CPC ........ B23D 45/16; B23D 47/02; B23D 47/12; B23D 59/006; B23D 59/0062; B23D 59/0064; B25F 5/02
(Continued)

(56) References Cited

U.S. PATENT DOCUMENTS 3,364,407 A   1/1968   Hill
3,386,019 A   5/1968   Hill
(Continued)

FOREIGN PATENT DOCUMENTS

DE    29815937 U1 * 12/1998   ......... B23Q 11/0042
EP    2674261 A1     12/2013
(Continued)

OTHER PUBLICATIONS

Milwaukee Electric Tool Corporation, "M18 Fuel 5-3/8" Metal Cutting Saw," Service Parts List, Sep. 2018 (3 pages).
(Continued)

*Primary Examiner* — Jason Daniel Prone
(74) *Attorney, Agent, or Firm* — Michael Best & Friedrich LLP

(57) ABSTRACT

A circular saw includes a blade guard and a saw blade at least partially enclosed within the blade guard. The saw blade has an outer diameter that is greater than 6 inches. The circular saw further includes a motor housing coupled to the blade guard, a brushless electric motor supported within the motor housing, and a battery pack for providing power to the brushless electric motor.

24 Claims, 11 Drawing Sheets

(58) Field of Classification Search
USPC .................................................. 30/388–391
See application file for complete search history.

(56) References Cited

U.S. PATENT DOCUMENTS

| | | | |
|---|---|---|---|
| 3,809,935 A | 5/1974 | Kristen et al. | |
| 3,873,862 A * | 3/1975 | Butler | B23D 59/006 |
| | | | D8/66 |
| 4,466,187 A * | 8/1984 | Morimoto | B23Q 11/0078 |
| | | | 30/390 |
| 4,668,898 A | 5/1987 | Harms et al. | |
| 4,675,999 A * | 6/1987 | Ito | B23Q 11/0042 |
| | | | 30/390 |
| 5,074,044 A * | 12/1991 | Duncan | B23Q 11/0046 |
| | | | 30/390 |
| 5,099,182 A * | 3/1992 | Isaacson | H02K 5/128 |
| | | | 310/156.56 |
| 5,159,218 A | 10/1992 | Murry et al. | |
| 5,327,649 A * | 7/1994 | Skinner | B23Q 11/0046 |
| | | | 30/194 |
| 5,349,752 A * | 9/1994 | Stirm | B23Q 11/0046 |
| | | | 30/475 |
| 5,435,066 A * | 7/1995 | Bare | B23D 59/006 |
| | | | 30/388 |
| 5,675,895 A * | 10/1997 | Mori | B23Q 11/0042 |
| | | | 30/390 |
| 5,701,676 A * | 12/1997 | Itoh | B23D 59/02 |
| | | | 30/388 |
| 5,856,715 A * | 1/1999 | Peot | B23D 47/12 |
| | | | 30/388 |
| 5,878,607 A * | 3/1999 | Nunes | B23D 47/12 |
| | | | 30/391 |
| 5,974,674 A * | 11/1999 | Kelly | B27B 9/02 |
| | | | 30/390 |
| 6,014,811 A * | 1/2000 | Taomo | B23D 59/006 |
| | | | 30/390 |
| 6,039,037 A * | 3/2000 | Taomo | B23D 47/12 |
| | | | 30/390 |
| 6,069,428 A | 5/2000 | Nelson | |
| 6,108,912 A * | 8/2000 | Radigan | B23D 59/006 |
| | | | 30/390 |
| 6,219,922 B1 * | 4/2001 | Campbell | B23Q 11/0042 |
| | | | 30/390 |
| 6,307,337 B1 | 10/2001 | Nelson | |
| 6,321,032 B1 * | 11/2001 | Jones | H02P 25/102 |
| | | | 388/811 |
| 6,557,261 B1 * | 5/2003 | Buser | B23Q 11/0046 |
| | | | 30/390 |
| 6,902,446 B1 | 6/2005 | Healey | |
| 6,949,849 B1 | 9/2005 | Wright et al. | |
| 7,562,456 B2 * | 7/2009 | Roehm | B23Q 11/005 |
| | | | 30/390 |
| 7,628,102 B2 * | 12/2009 | Kamiya | B23Q 11/005 |
| | | | 30/389 |
| 8,896,169 B2 | 11/2014 | Song et al. | |
| 9,364,906 B2 * | 6/2016 | Abe | B25F 5/02 |
| 9,450,471 B2 | 9/2016 | Mergener et al. | |
| 9,450,476 B2 | 9/2016 | Ito et al. | |
| 9,774,229 B1 | 9/2017 | Mergener et al. | |
| 9,787,159 B2 | 10/2017 | Beyerl | |
| 9,937,570 B2 * | 4/2018 | Chen | B23D 47/12 |
| 9,954,417 B2 | 4/2018 | Mergener et al. | |
| 9,960,656 B2 | 5/2018 | Mergener et al. | |
| 10,056,806 B2 * | 8/2018 | Hatfield | H02K 9/227 |
| 10,122,236 B2 | 11/2018 | Song et al. | |
| 10,122,248 B2 | 11/2018 | Acinas Lope et al. | |
| 10,913,174 B2 * | 2/2021 | Nakashima | B23D 45/16 |
| 11,077,507 B1 * | 8/2021 | Matson | B23D 59/006 |
| 11,685,034 B2 * | 6/2023 | Hanussek | B23D 45/16 |
| | | | 30/388 |
| 2004/0060178 A1 * | 4/2004 | Willer | B27B 9/00 |
| | | | 30/391 |
| 2006/0065097 A1 | 3/2006 | Yoshimura et al. | |
| 2008/0073986 A1 | 3/2008 | Lee | |
| 2009/0183377 A1 * | 7/2009 | Loveless | B23D 59/006 |
| | | | 30/390 |
| 2010/0269353 A1 * | 10/2010 | Martin | B23D 59/006 |
| | | | 30/390 |
| 2010/0320880 A1 | 12/2010 | Kamogi | |
| 2012/0234305 A1 * | 9/2012 | Jonsson | B23D 47/12 |
| | | | 125/15 |
| 2013/0185947 A1 * | 7/2013 | Barkley | B23D 47/12 |
| | | | 30/388 |
| 2014/0215839 A1 * | 8/2014 | Abe | B23Q 11/126 |
| | | | 30/388 |
| 2017/0066068 A1 * | 3/2017 | Hanussek | B23D 45/16 |
| 2017/0310194 A1 | 10/2017 | Beyerl | |
| 2017/0317548 A1 * | 11/2017 | Suzuki | B23D 45/16 |
| 2018/0029148 A1 | 2/2018 | Suzuki et al. | |
| 2018/0076651 A1 * | 3/2018 | Cox | B25F 5/02 |
| 2018/0083510 A1 | 3/2018 | Purohit et al. | |
| 2018/0084646 A1 | 3/2018 | Purohit et al. | |
| 2018/0248446 A1 | 8/2018 | Mergener et al. | |
| 2018/0248451 A1 | 8/2018 | Hagiwara | |
| 2018/0366697 A1 | 12/2018 | Elfering et al. | |
| 2018/0369939 A1 | 12/2018 | Zimmerman et al. | |
| 2019/0044110 A1 | 2/2019 | Sheeks et al. | |
| 2019/0077004 A1 | 3/2019 | Numata | |
| 2021/0205904 A1 * | 7/2021 | Schmitz | B23D 45/16 |
| 2023/0201934 A1 * | 6/2023 | Funabiki | B23Q 11/06 |
| | | | 30/390 |

FOREIGN PATENT DOCUMENTS

| | | |
|---|---|---|
| JP | 2006289571 A | 10/2006 |
| JP | 2018094853 A | 6/2018 |
| WO | 2013136788 A1 | 9/2013 |
| WO | 2019107052 A1 | 6/2019 |

OTHER PUBLICATIONS

Milwaukee Electric Tool Corporation, "Metal Cutting Saw," Service Parts List, May 2013 (2 pages).
Milwaukee Electric Tool Corporation, "M18 Fuel Hp 7-1/4" Circular Saw," Service Parts List, Jun. 2018 (3 pages).
International Search Report and Written Opinion for Application No. PCT/US2020/043166 dated Oct. 27, 2020 (10 pages).
Extended European Search Report for Application No. 20848427.9 dated Dec. 15, 2023 (11 pages).

* cited by examiner

CIRCULAR SAW

CROSS-REFERENCE TO RELATED APPLICATIONS

This application is a national phase filing under 35 U.S.C. 371 of International Application No. PCT/US2020/043166 filed on Jul. 23, 2020, which claims priority to U.S. Provisional Patent Application No. 62/878,831 filed on Jul. 26, 2019, the entire contents of which are incorporated herein by reference.

FIELD OF THE INVENTION

The present invention relates to power tools and, more particularly, to circular saws.

BACKGROUND OF THE INVENTION

Generally, circular saws include saw blades specifically configured to cut work pieces made of a variety of materials, such as, for example, metals, fiber, or wood.

SUMMARY OF THE INVENTION

The invention provides, in one aspect, a circular saw including a blade guard and a saw blade at least partially enclosed within the blade guard. The saw blade has an outer diameter that is greater than 6 inches. The circular saw further includes a motor housing coupled to the blade guard, a brushless electric motor supported within the motor housing, and a battery pack for providing power to the brushless electric motor.

The invention provides, in another aspect, a circular saw including a blade guard, a saw blade at least partially enclosed within the blade guard, a motor housing coupled to the blade guard, and an electric motor supported within the motor housing. The electric motor includes an output shaft that is operable at a maximum speed greater than 15,000 revolutions per minute. The circular saw further includes a battery pack for providing power to the electric motor, the battery pack has a nominal voltage up to 20 volts and is configured to output at least 100 amperes of current to the electric motor to provide a power output of at least 1,800 watts.

The invention provides, in another aspect, a circular saw including a blade guard defining an exhaust chamber, a motor housing coupled to the blade guard, and a brushless electric motor positioned within the motor housing. The brushless electric motor includes an output shaft and a fan coupled for rotation with the output shaft. The fan includes a base plate and a plurality of blades extending from the base plate. The circular saw further includes a first baffle positioned adjacent the fan and in facing relationship with the base plate, a second baffle positioned radially outward of the fan, and a battery pack for providing power to the brushless electric motor. A cooling airflow is axially induced by the fan through the brushless electric motor in response to activation of the brushless electric motor, and the fan is configured to redirect the cooling airflow in a radial direction against the second baffle. The second baffle is configured to redirect the cooling airflow in an axial direction toward the exhaust chamber in the blade guard.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
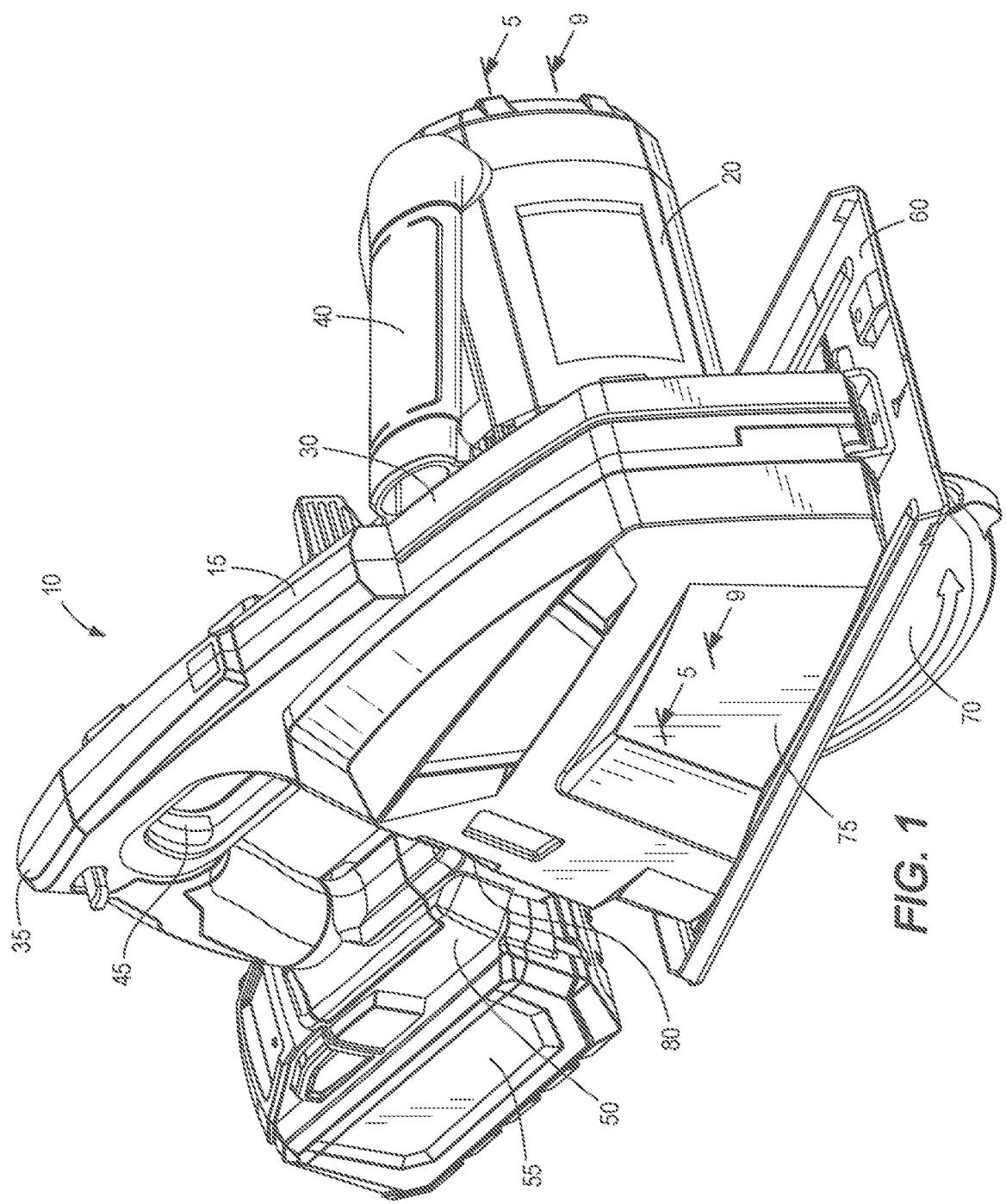
FIG. 1 is a front perspective view of a circular saw according to one embodiment of the invention.

FIG. 1 illustrates a power tool, such as a circular saw 10. In some constructions and in some aspects, the circular saw 10 is a metal cutting circular saw 10. The circular saw 10 is configured to drive a saw blade 12 (FIG. 5) that has an outer diameter that is greater than approximately 6 inches. In some embodiments, the outer diameter of the saw blade is within a range of approximately 6 inches to approximately 12 inches. In other embodiments, the circular saw blade has an outer diameter of approximately 8 inches.

With continued reference to FIG. 1, the circular saw 10 includes a motor housing 20, an electric motor 25 positioned within the motor housing 20 (FIG. 5), and an upper blade guard 30 enclosing an upper portion of the saw blade 12. In the illustrated embodiment, the motor 25 is preferably a brushless direct-current ("BLDC") motor. The circular saw 10 also includes a rear handle 35 extending rearward from the upper blade guard 30 and a front handle 40 coupled to the motor housing 20 at one end and to the upper blade guard 30 at the other end. The rear handle 35 includes a trigger 45 to activate the motor 25 and drive the saw blade 12 and a battery receptacle 50 to receive a battery pack 55. The illustrated battery pack 55 is a power tool battery pack having a plurality of rechargeable battery cells (not shown). The battery cells may be lithium-based or have any other suitable chemistry.

In the illustrated embodiment, the motor 25 and the battery pack 55, together, form a high power battery-powered system like the one disclosed in U.S. patent application Ser. No. 16/045,513 filed Jul. 25, 2018 (U.S. Patent Application Publication No. 2019/0044110), the entire content of which is incorporated herein by reference. As such, the battery pack 55 has a nominal voltage of up to about 20 volts (V) (e.g., about 18 V to about 20 V) and a capacity of up to about 12 ampere-hours (Ah). The battery pack 55 and the motor 25 are operable to produce a high power output—a peak power of 1800 watts (W) to 2400 W or more (2.4 horsepower (hp) to 3.0 hp or more). In order to achieve this peak power when the saw blade 12 is loaded (i.e., performing work on a workpiece), a high current (e.g., 100 amperes (A) or more) is discharged from the battery pack 55, through a motor controller, and to the motor 25. However, when there is no load placed on the saw blade 12, the motor draws approximately between 10 A and 18 A from the battery pack 55.

With continued reference to FIG. 1, the saw 10 also includes a shoe 60 connected to the upper blade guard 30 for supporting the circular saw 10 on a workpiece. The shoe 60 is generally oriented perpendicular to a plane defined by the saw blade 12 and separates an upper portion of the saw blade 12 from a lower portion. The shoe 60 includes a slot 65 (FIG. 4) through which the saw blade 12 passes. The bottom surface of the shoe 60 is engageable with a surface of the work piece and is smooth to allow the shoe to slide across the surface of the work piece as the saw blade 12 cuts the work piece. The shoe 60 is pivotable with respect to the upper blade guard 30 in order to adjust the cutting depth of the saw blade 12. And, in some embodiments, the shoe 60 may also be pivotable to adjust a bevel angle of the saw blade 12. The circular saw 10 further includes a lower blade guard 70 pivotably attached to the upper blade guard 30 to selectively cover the lower portion of the saw blade 12 below the shoe 60 so that, at most, only a small portion of the front of the saw blade 12 is exposed. During cutting, the lower blade guard 70 engages the work piece, and forward displacement of the saw 10 causes the lower blade guard to pivot to expose more of the saw blade 12 to cut the work piece.

The circular saw 10 further includes a chip collecting cover 75 coupled to the upper blade guard 30 in which chips and other debris accumulate during a cutting operation. The cover 75 includes a quick release latch 80 to facilitate removal of the cover 75 from the upper blade guard 30, without using tools, to empty debris from the cover 75.

Figure 3:
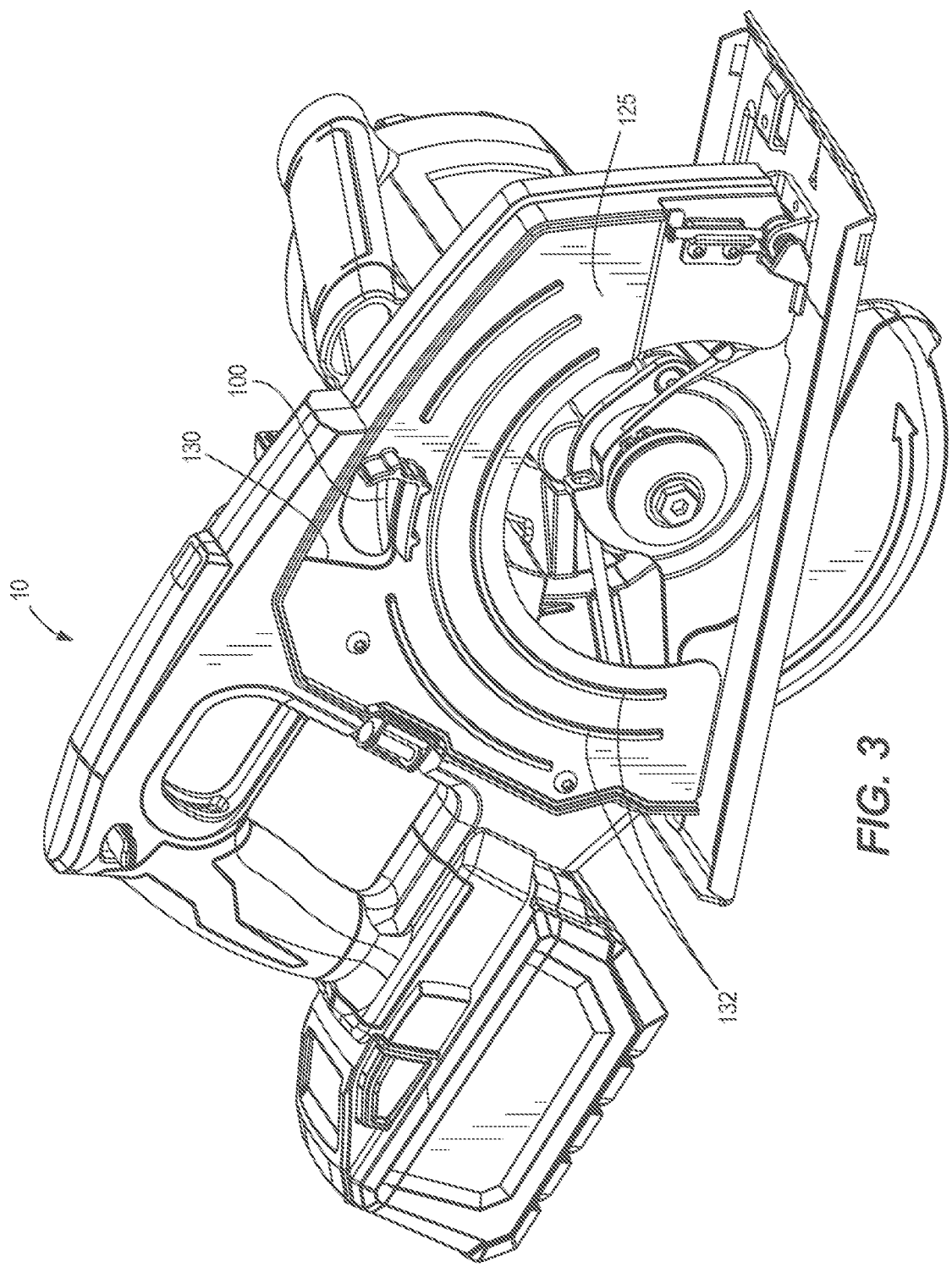
FIG. 3 is a perspective view of the circular saw of FIG. 1 with a portion removed.
Figure 4:
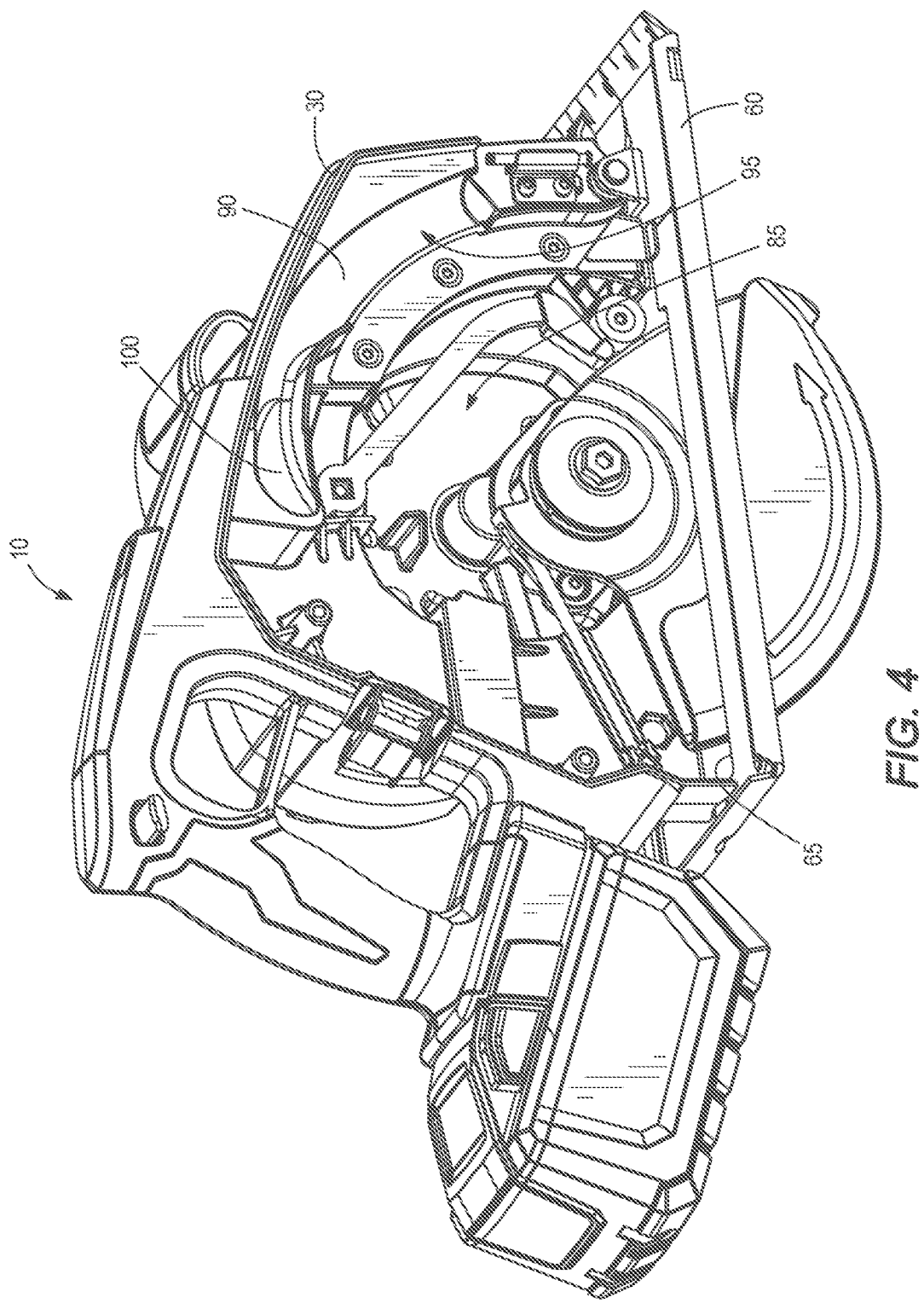
FIG. 4 is a rear perspective view of the circular saw of FIG. 1 with a portion removed.
Figure 5:
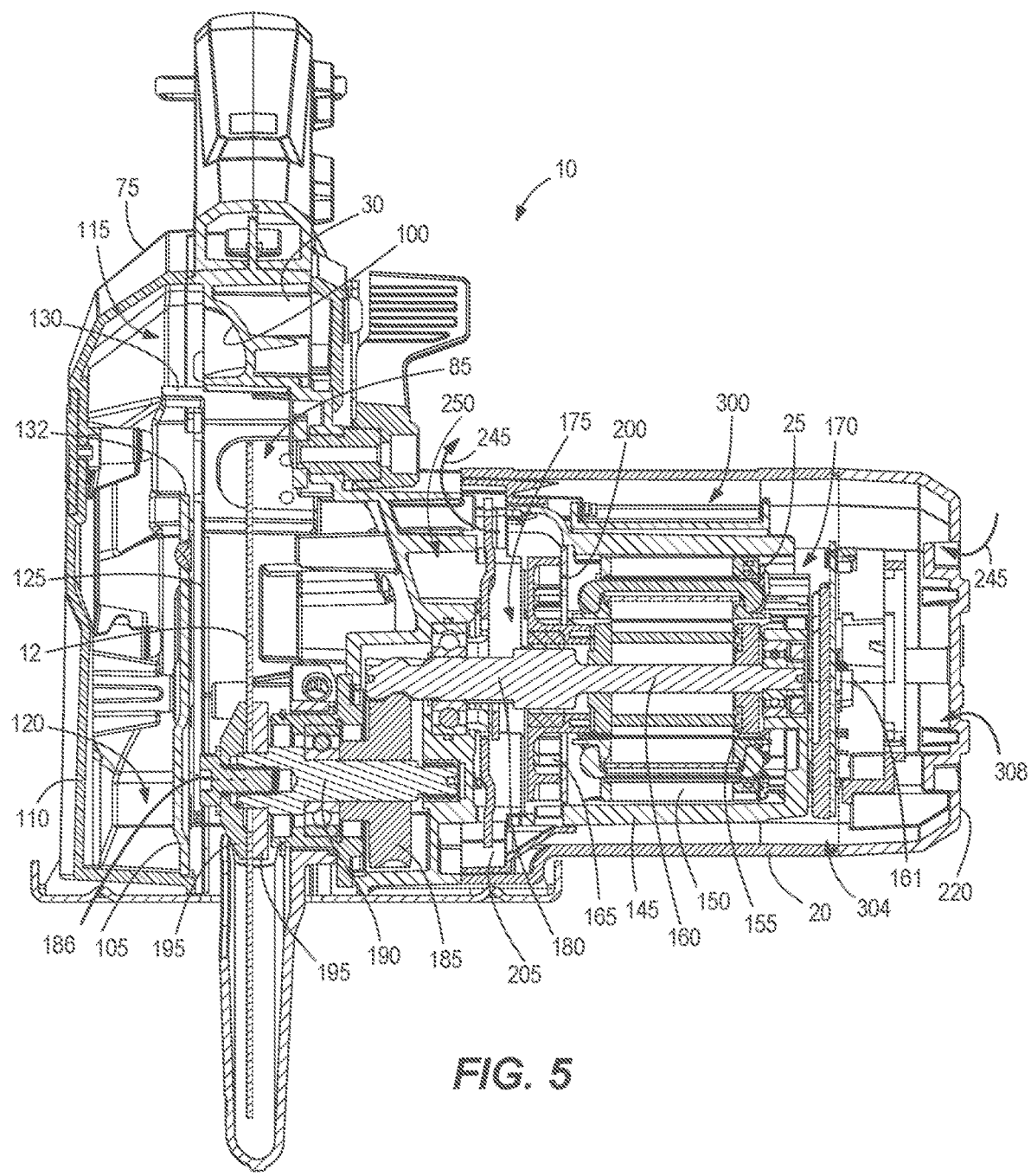
FIG. 5 is a cross-sectional view of the circular saw of FIG. 1, taken along line 5-5 shown in FIG. 1.

As shown in FIGS. 3-5, a combination of the upper blade guard 30 and an inner blade guard 125 (FIG. 3) defines a blade chamber 85 (FIG. 4) in which the saw blade 12 is positioned. The upper blade guard 30 includes an arcuate duct 90 (FIG. 4) that is partially covered by the inner blade guard 125. The duct 90 includes an opening 95 (FIG. 4) proximate the front edge of the saw blade 12 through which debris can enter the duct 90. The duct 90 terminates in a chip outlet 100 that is in communication with an interior of the cover 75 (FIG. 5). The cover 75 includes an inner wall 105 and an outer wall 110 defining therebetween an opening 115 in communication with the chip outlet 100. The inner wall 105 and the outer wall 110 define a storage receptacle 120 in which chips and other debris from a workpiece accumulate during a cutting operation.

Figure 6:
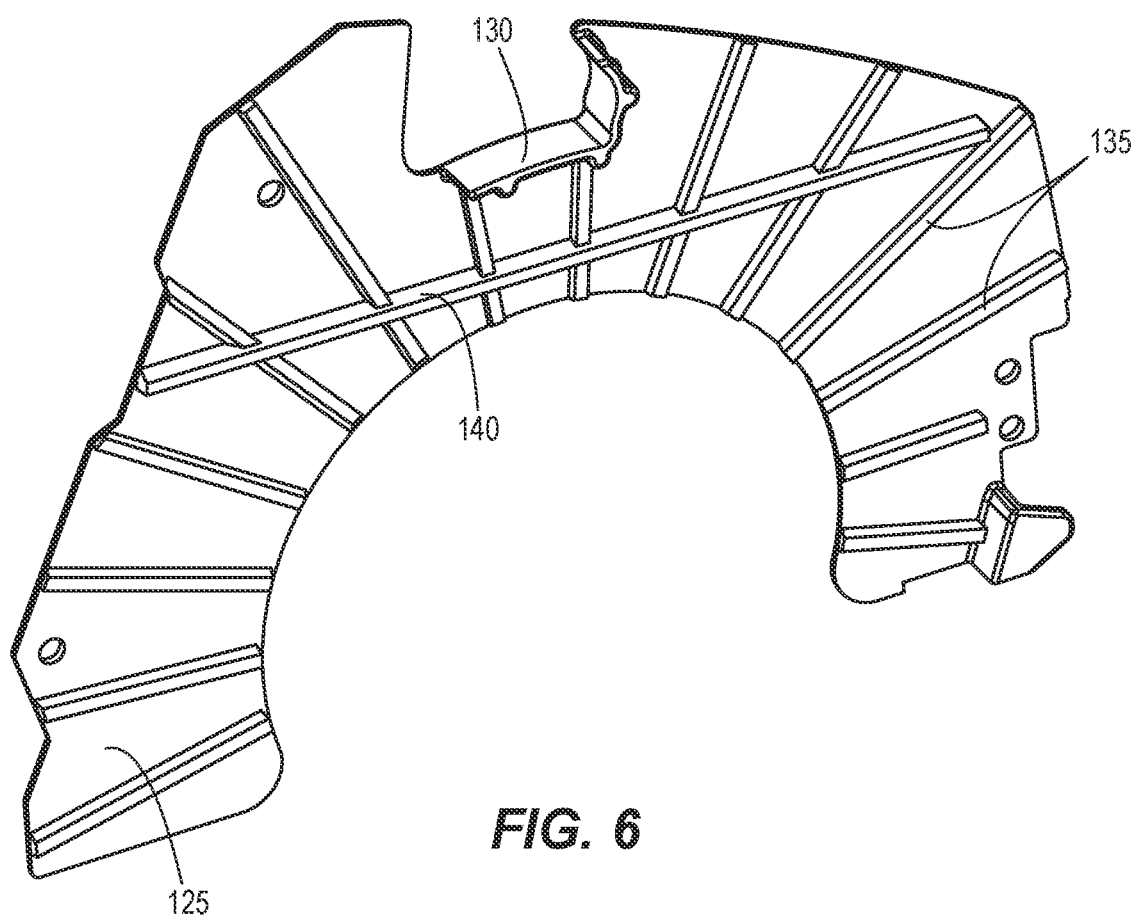
FIG. 6 is a perspective view of an inner blade guard of the circular saw of FIG. 1.

With reference to FIGS. 3 and 5, the inner blade guard 125 is positioned between the upper blade guard 30 and the inner wall 105 of the cover 75. The inner blade guard 125 includes an opening 130 positioned between the chip outlet 100 and the cover opening 115 to communicate the duct 90 and the storage receptacle 120. The inner blade guard 125 includes a plurality of ribs 132 that bridge a gap between the inner blade guard 125 and the inner wall 105 of the cover 75 to prevent chips from falling out while passing from the blade chamber 85 to the storage receptacle 120. As shown in FIG. 6, in other embodiments, the inner blade guard 125 includes radial ribs 135 that reduce warping and a horizontal rib 140 extending across the inner blade guard 125. The horizontal rib 140 bridges a gap between the inner blade guard 125 and the inner wall 105 of the cover 75 to prevent chips from falling out while passing from the blade chamber 85 to the storage receptacle 120.

Rotation of the saw blade 12 induces an airflow within the blade chamber 85 of the upper blade guard 30 that accelerates chips and debris both radially and circumferentially away from the saw blade 12 and into the opening 95 of the duct 90. The airflow created within the blade chamber 85 carries the chips and debris from the workpiece through the duct 90 and through the chip outlet 100, the opening 130 of the inner blade guard 125, the opening 115 of the cover 75, and into the storage receptacle 120. The airflow created within the blade chamber 85 then exits the circular saw 10 then exits the circular saw 10 by following the saw blade 12 out through the bottom of the tool.

Referring to FIG. 5 the motor 25 includes a motor case 145, a stator 150 supported within the motor case 145, a rotor 155 supported within the motor case 145, a motor shaft 160 extending from the motor case 145, and a fan 165 positioned on the motor shaft 160 for rotation with the motor shaft 160. The motor case 145 includes an inlet end 170 and an outlet end 175 opposite the inlet end 170. The inlet end 170 defines openings into the interior of the motor case 145. The outlet end 175 defines an opening adjacent the fan 165. The fan 165 includes a base plate 176 and a plurality of blades 178 extending from the base plate (FIG. 7).

In the illustrated embodiment, the rotor 155 is an interior permanent magnet (IPM) type rotor (a.k.a., a buried magnet type rotor). As such, the rotor 155 includes a plurality of permanent magnets (e.g., N45H magnets). The stator 150 includes stator windings having six coils connected in a three phase, parallel delta configuration. The coils may be connected in alternative configurations (i.e., series, delta, etc.). The stator windings include wires that are 1.5 mm in diameter and extend around the stator 150 11.5 turns.

With continued reference to FIG. 5, a pinion 180 is coupled to the motor shaft 160. In the illustrated embodiment, the pinion 180 is integrated with the motor shaft 160. In other embodiments, the pinion 180 may be welded or coupled in other ways to the motor shaft 160. The pinion 180 interfaces with a drive gear 185 that has an axis of rotation 186 (i.e., a drive axis) that is parallel with an axis of rotation 161 (i.e., a motor rotation axis) of the motor shaft 160 and the pinion 180. In the illustrated embodiment, the axis 186 is also the rotational axis of the saw blade 12. The drive gear 185 is coupled to an arbor 190 for co-rotation therewith. In the illustrated embodiment, the arbor 190 is a ⅝" arbor and the arbor 190 is press fit into the drive gear 185. In other embodiments, the arbor 190 may include a different size. The arbor 190 extends into the blade chamber 85 and includes two flanges 195 between which the saw blade 12 is clamped. The motor 25 is configured to rotate the motor shaft 160 at a no-load speed (i.e., not cutting into a workpiece) between 19,000 RPM and 20,000 RPM. The ratio of the teeth on the pinion 180 to the teeth on the drive gear 185 is 37:7. As such, the drive gear 185 and arbor 190 are able to rotate the saw blade 12 at least within a range of 3,500 RPM and 4,000 RPM.

Figure 7:
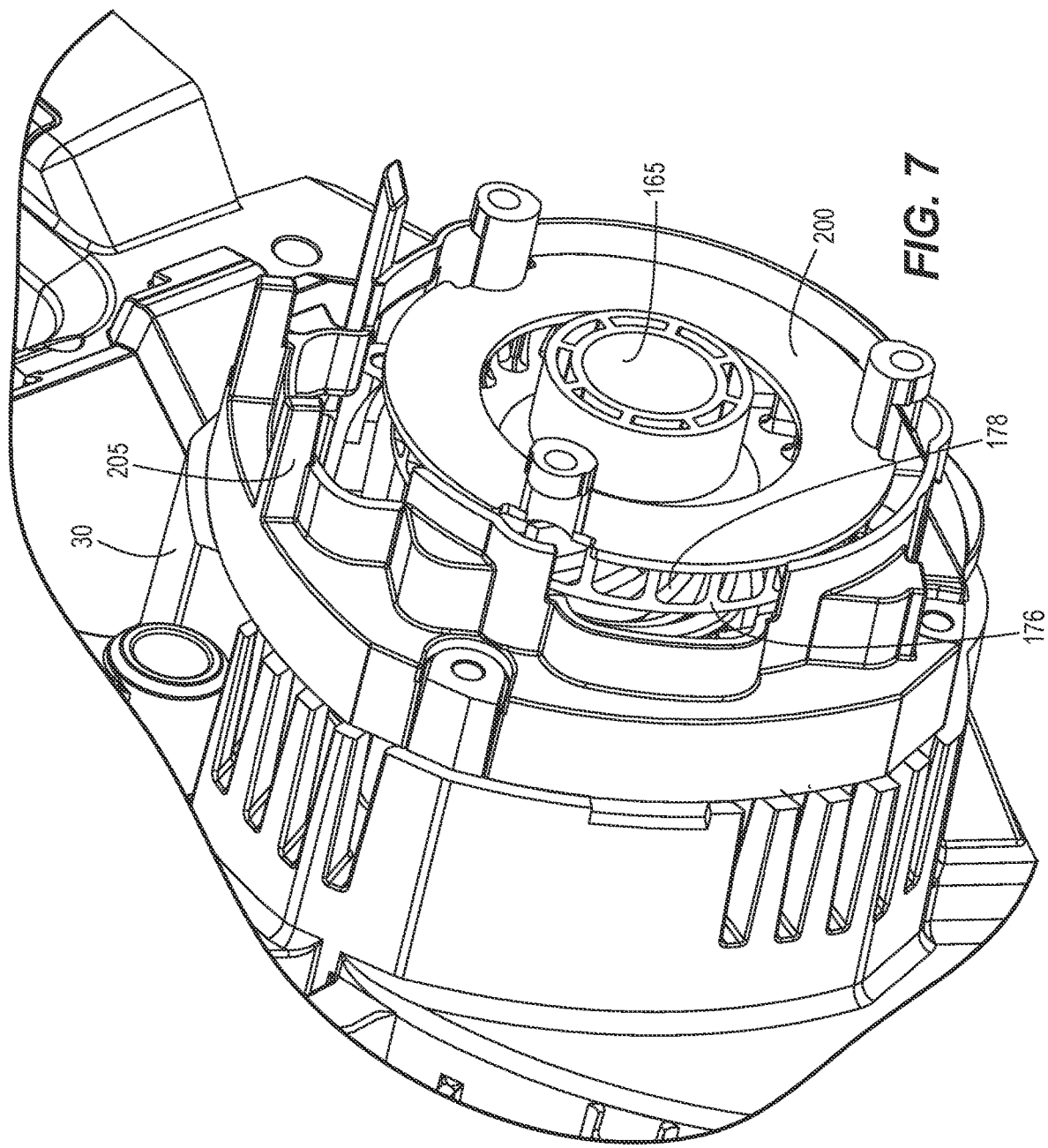
FIG. 7 is an enlarged, front perspective view of the circular saw of FIG. 1 with a motor housing removed, illustrating a first and second baffle.

With reference to FIGS. 5 and 7, the motor 25 further includes a first baffle 200 adjacent the fan 165 and in facing relationship with the base plate 176 of the fan 165 and a second baffle 205 that is positioned radially outward of the fan 165. The first and second baffles 200, 205 are both axially aligned with the motor shaft 160. In other words, the first and second baffles 200, 205 are positioned around the motor shaft 160 and the axis 161. The first baffle 200 is positioned within the motor case 145. Specifically, the first baffle 200 is positioned between the fan 165 and the stator 150. The first baffle 200 is generally circular and includes a flat outer periphery. The second baffle 205 is generally circular but has a non-flat outer periphery. In the illustrated embodiment, the second baffle 205 is positioned between the upper blade guard 30 and the motor case 145, and positioned at least partially within the motor housing 20.

Figure 8:
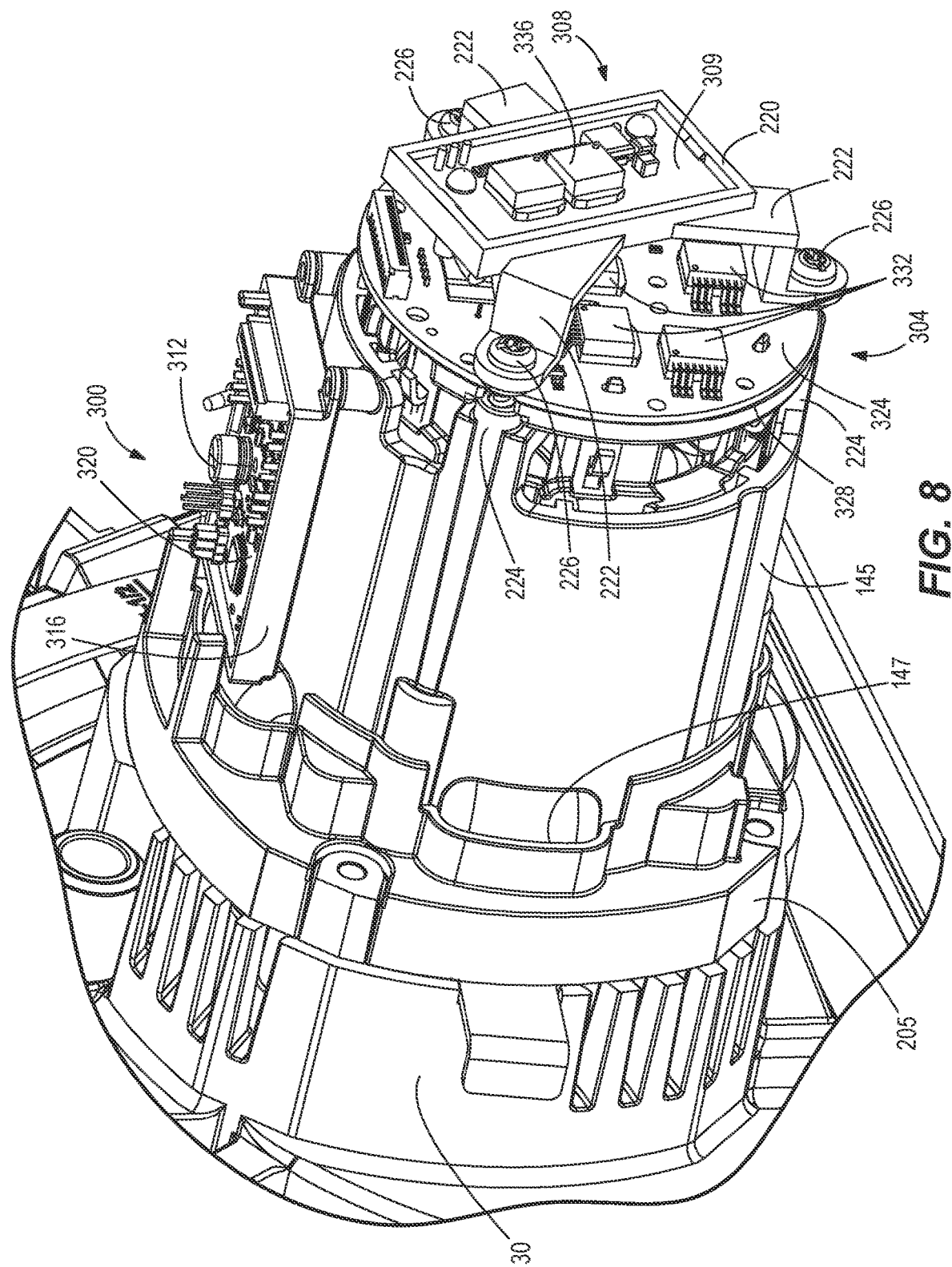
FIG. 8 is an enlarged, front perspective view of the circular saw of FIG. 1 with a motor housing removed, illustrating an electric motor and a printed circuit board assembly.

With reference to FIG. 8, the circular saw 10 further includes a control PCB assembly 300, a power PCB assembly 304, and a solid state disconnect ("SSD") PCB assembly 308. The control PCB assembly 300 includes a circuit board 312 positioned within a mount 316, and a controller 320 (i.e., control unit, microprocessor, etc.) mounted on the circuit board 312. The control PCB assembly 300 is mounted on the motor case 145. More specifically, the mount 316 is secured to the motor case 145 via a fastener, for example. The power PCB assembly 304 is positioned at an axial end of the motor 25 adjacent the inlet end 170 of the motor case 145. The power PCB assembly 304 includes a circuit board 324 thermally coupled to a heat sink 328, and a plurality of power switches 332 (e.g., FETs, MOSFETs, IGBTs, etc.) mounted on the circuit board 324. Operation of the motor 25 is governed by the controller 320, which may include at least an electronic processor and a memory storing instructions that are executed by the electronic processor to carry out the functionality of the controller 320. For example, during operation, the controller 320 receives rotor position information from rotor position sensors (e.g., Hall sensors or rotary encoders) monitoring the rotational position of the rotor 155, and selectively controls the plurality of power switches 332 to energize coils of the stator 150 to drive the rotor 155. For example, the plurality of power switches 332 may be in a six-transistor bridge arrangement, with three high-side transistors and three low-side transistors. The controller 320 may sequentially enable transistors pairs, each having one high-side and one low-side transistor, using a pulse width modulated (PWM) signal as the rotor 155 rotates. For example, as the controller 320 detects that the rotor 155 reaches particular angular positions during rotation, the controller 320 advances to energize the next transistor pair to continue to generate a magnetic field with energized coils of the stator 150 that drive further rotation of the rotor 155.

Figure 9:
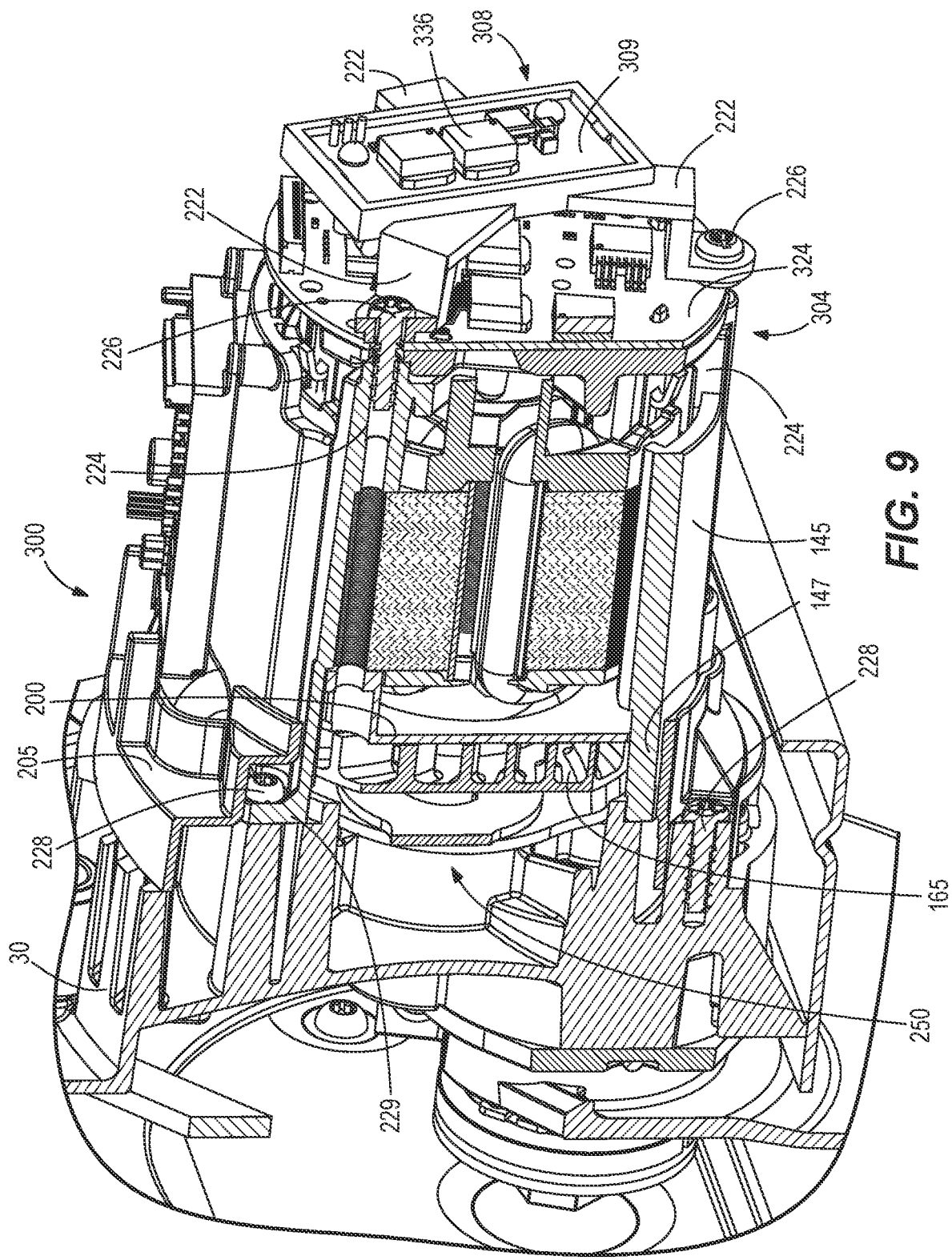
FIG. 9 is a cross-sectional view of the circular saw of FIG. 1 with a motor housing removed, taken along line 9-9 shown in FIG. 1.

The SSD PCB assembly 308 includes a circuit board 309 received within a mount 220 that axially spaces the SSD PCB assembly 308 from the power PCB assembly 304. In other words, the SSD PCB assembly 308 is spaced from and parallel to the power PCB assembly 304. The SSD PCB assembly is also positioned at an axial end of the motor 25 adjacent the inlet end 170 of the motor case 145. As shown in FIGS. 8 and 9, the mount 220 includes three legs 222 that are coupled to posts 224 on the motor case 145. The mount 220 is coupled to the motor case 145 with fasteners 226. The power PCB assembly 304 is positioned between the legs 222 of the mount 220 and the motor case 145. The fasteners 226 secure the power PCB assembly 304 between the legs 222 of the mount 220 and the motor case 145. As shown in FIG. 9, the motor case 145 is coupled to the upper blade guard 30 with additional fasteners 228. An edge 229 (FIG. 9) of the motor case 145 opposite the mount 220 is abutted with the blade guard 30. The second baffle 205 overlaps a portion 147 of the motor case 145, covering the fasteners 228. In the illustrated embodiment, the second baffle 205 extends between the motor case 145 and the blade guard 30 (FIG. 8).

Figure 10:
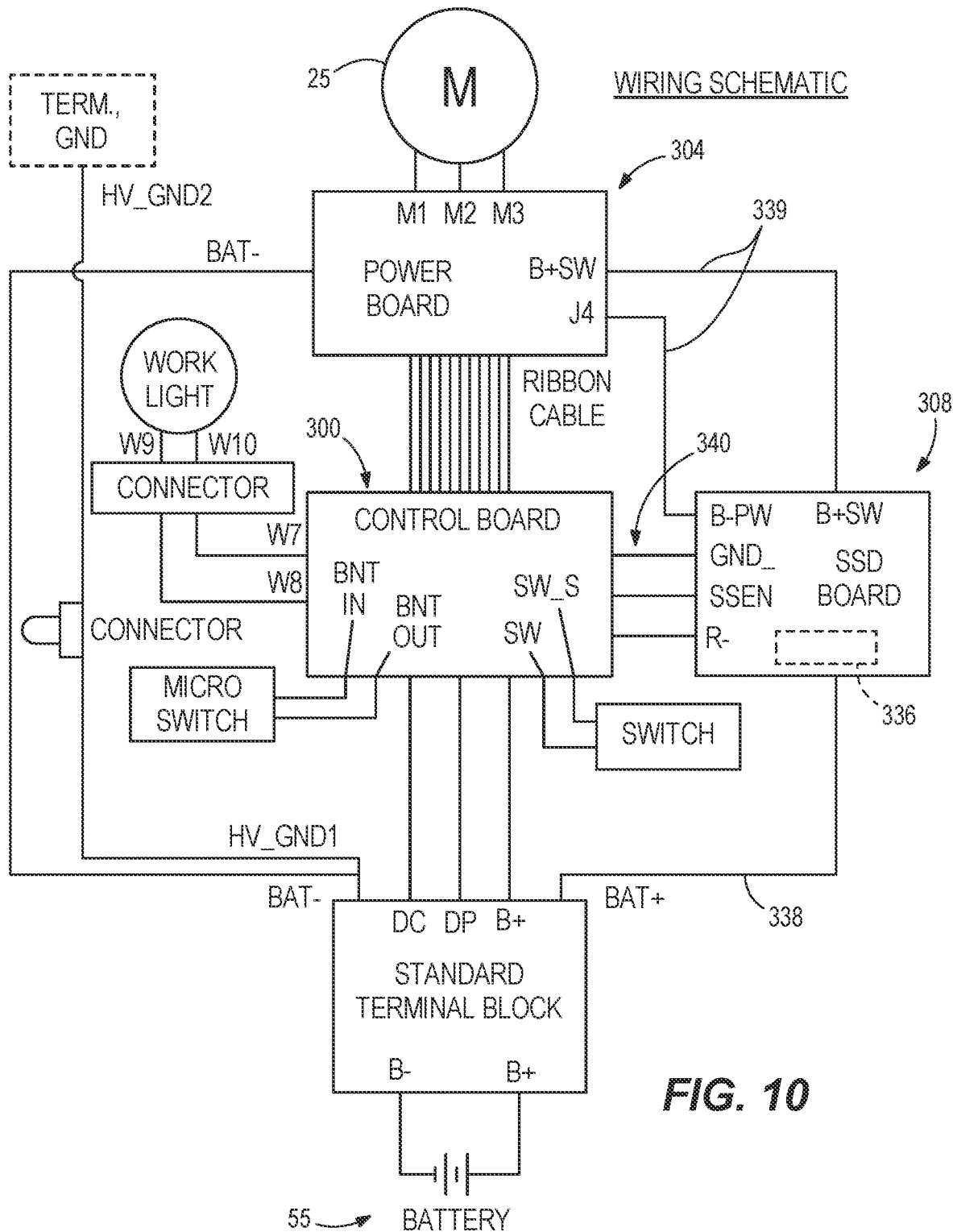
FIG. 10 is a wiring schematic of the circular saw of FIG. 1.

With reference to FIG. 10, a first wiring schematic for a power tool, such as the circular saw 10, is illustrated with the SSD PCB assembly 308 in electrical communication with the power PCB assembly 304 and the control PCB assembly 300. The SSD PCB assembly 308 includes a solid state disconnect switch 336 (FIG. 8) provided between the battery pack 55 and the power PCB assembly 304. Specifically, the SSD PCB assembly 308 is electrically coupled to a positive terminal (B+) of the battery pack 55 via connection 338 and is also electrically coupled to the power PCB assembly 304 via connections 339. The solid state disconnect switch 336 is semiconductor based. When the solid state disconnect switch 336 is closed, the solid state disconnect switch 336 allows a current to flow through to the power PCB assembly 304, and, when the solid state disconnect switch 336 is open, the solid state disconnect switch 336 prevents a current from flowing to the power PCB assembly 304. The solid state disconnect switch 336 provides an under-voltage protection to the power switches 332 and may also prevent a current flow through to the power switches 332 in a failure condition of the controller 320.

Figure 11:
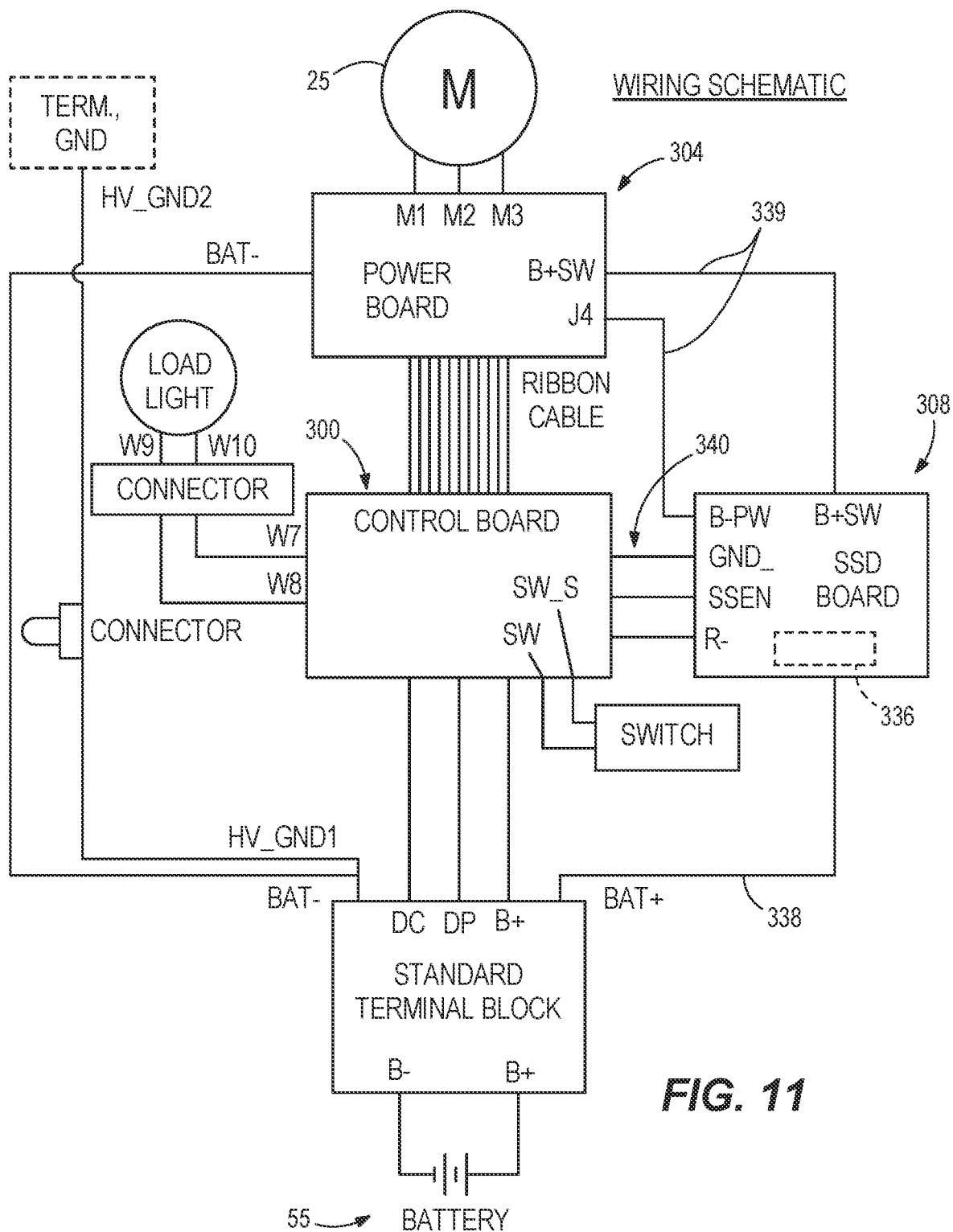
FIG. 11 is a wiring schematic according to another embodiment for the circular saw of FIG. 1.

With reference to FIG. 11, an alternative wiring schematic for a power tool, such as the circular saw 10, is illustrated. As one specific example, the wiring schematic of FIG. 11 is applicable to an implementation of the circular saw 10 as a metal cutting saw. The alternative wiring diagram of FIG. 11 is similar to that of FIG. 10 with only differences described below. For example, the micro-switch of FIG. 10 is not included in the wiring schematic of FIG. 11. In addition, the wiring schematic of FIG. 11 includes a load indication light 337 (also referred to as an eco-indicator). The load indication light 337 is configured to warn a user when the circular saw 10 is overloaded. In some embodiments, the load indication light 337 is positioned on a tool housing (e.g., motor housing 20, rear handle 35, etc.) within a line of sight of a user during operation of the saw 10. The load indication light 337 is configured to indicate an amount of power being used by the saw 10 during operation (i.e., an amount of current being drawn from the battery pack 55). For example, the control board 300 is configured to detect an amount of being current drawn from the battery pack 55 (e.g., using a current sense resistor) and drive the load indication light 337 to indicate to the user the amount of current being drawn in real time. In some embodiments, the load indication light 337 includes five LED bars distributed in a performance map that is segmented into a plurality of performance regions for operating the saw 10. As such, when a user operates the saw, the LED bars are illuminated based on the system performance of the saw 10 (e.g., the more current drawn, the more LED bars illuminated). As a result, the user is coached to achieve and maintain optimal or improved performance of the saw 10. Further disclosure of such a load indication light (i.e., eco-indicator) is found in U.S. patent application Ser. No. 16/272,182, filed Feb. 11, 2019, the entire contents of which is incorporated herein by reference. In some embodiments, both a work light and a load indicator light are included. In other embodiments, the work light is replaced with a load indicator light.

More specifically, the solid state disconnect switch 336 is controlled (i.e., opened and closed) by the controller 320. For example, the SSD PCB assembly 308 may include a logic circuit (not shown) that receives an input 340 from the controller 320. In some embodiments, the SSD PCB assembly 308 may also include an input from the trigger 45, and the solid state disconnect switch 336 may close to allow a discharging current to flow through only when both inputs from the controller 320 and the trigger 45 are at a logic high value. That is, the solid state disconnect switch 336 may close only when the trigger 45 is actuated, the controller 320 is functioning, and the controller 320 indicates there are no detected faults in the circular saw 10. As such, the solid state disconnect switch 336 may open when either of the inputs is low. For example, the solid state disconnect switch 336 may prevent a discharging current to flow through when either the trigger 45 is not actuated, when the controller 320 has failed, or when the controller 320 indicates a fault condition in the circular saw 10. In alternative embodiments, the logic is performed entirely on the control PCB assembly 300 and the controller 320 provides the open or close signal directly to the solid state disconnect switch 336.

In some embodiments, when the motor controller 320 determines that all power switches 332 are functioning, the controller 320 allows an operation of the circular saw 10. For example, the controller 320 continues to provide a signal (e.g., a logic high signal) to the solid state disconnect switch 336 to allow normal operation of the circular saw 10. When the controller 320 determines that at least one of the power switches 332 has failed, the controller 320 disables the circular saw 10. The controller 320 may temporarily or permanently disable the circular saw 10. For example, the controller 320 provides a signal (e.g., a low signal) to the solid state disconnect switch 336 to prevent a discharge current from flowing to the power switches 332.

Figure 2:
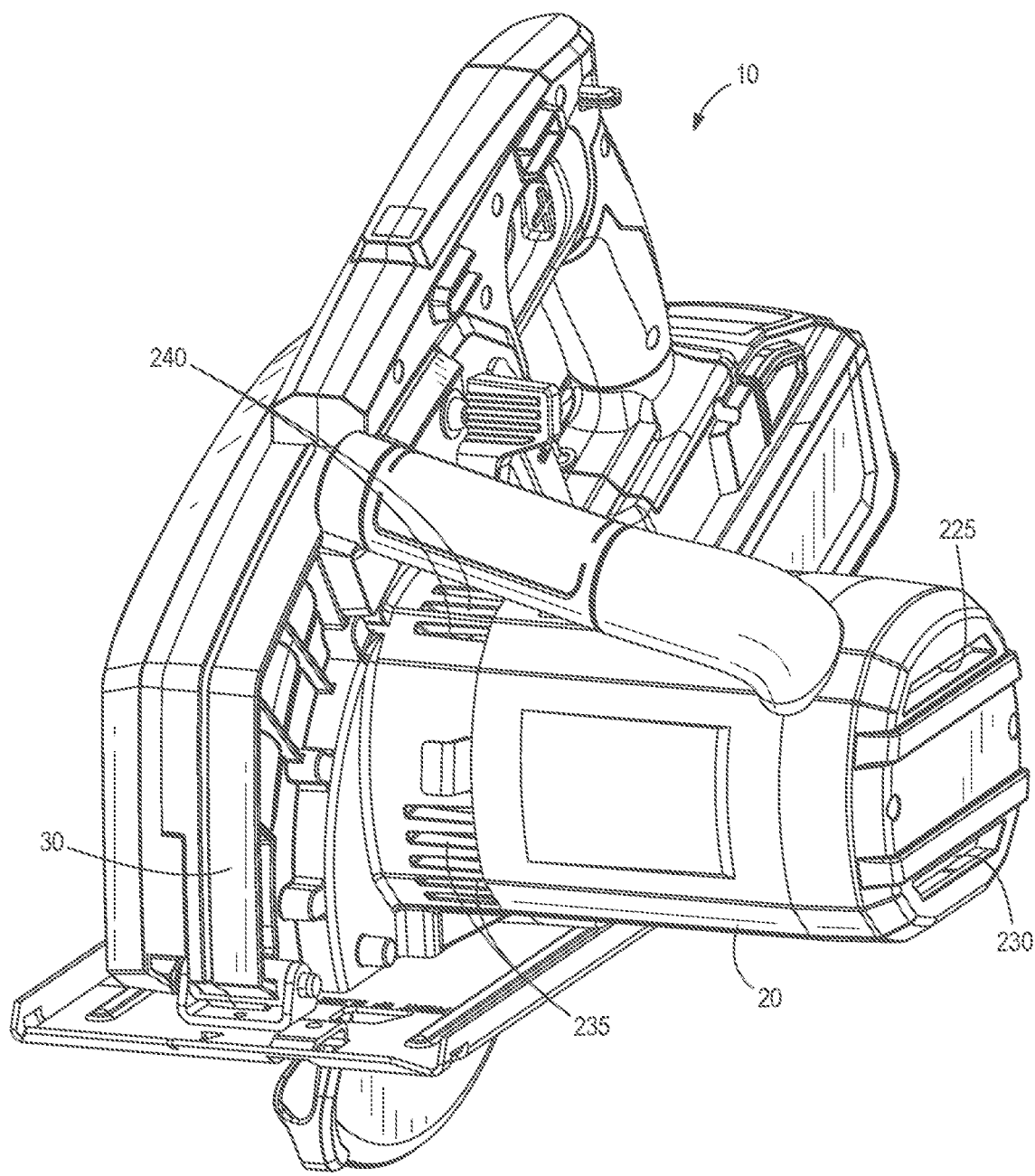
FIG. 2 is another front perspective view of the circular saw of FIG. 1.

With reference to FIG. 2, the motor housing 20 includes intake openings 225, 230 on a distal end thereof, and the blade guard 30 includes exhaust openings 235, 240 in fluid communication with an exhaust chamber 250 (FIG. 5) formed within the blade guard 30. In some embodiments, a filter may be positioned in the motor housing 20 adjacent the intake openings 225, 230 to prevent debris from entering the motor housing 20. The exhaust openings 235, 240 are positioned downstream of the exhaust chamber 250 which, in turn, is downstream of the fan 165.

With reference to FIG. 5, in the illustrated embodiment, the circular saw 10 includes a cooling airflow 245 that extends through the motor housing 20. The cooling airflow 245 is drawn by the fan 165 through the first and second intake openings 225, 230 and into the interior of the motor housing 20. The cooling airflow 245 then passes the SSD PCB assembly 308 and the power PCB assembly 304 and into the motor case 145 through the inlet end 170 to cool the stator 150 and the rotor 155. As the cooling airflow 245 passes the SSD PCB assembly 308 and power PCB assembly 304, it cools the electronics (i.e., the power switches 332 and the solid state disconnect switch 336). After passing the stator 150 and the rotor 155, the cooling airflow 245 is directed radially by the first baffle 200 towards the second baffle 205. The second baffle 205 redirects the cooling airflow 245 in an axial direction (i.e., in a direction parallel to the axis 161 of rotation of the motor shaft 160) towards the exhaust chamber 250 of the upper blade guard 30. In some embodiments, a portion of the cooling airflow 245 does not enter the motor case 145 immediately but instead first cools additional electronics mounted on top of the motor case 145. The cooling airflow 245 is then exhausted to the atmosphere through the exhaust openings 235, 240.

Providing a flat, annular baffle 200 (i.e., the first baffle) adjacent the fan 165 advantageously increases the cooling airflow 245 within the motor housing 20 to further cool the motor 25 and other electronic components of the circular saw 10. For example, as shown in Table 1 below, the volumetric flow rate, measured in cubic feet per minute (CFM), of the cooling airflow 245 is greater with both the first and second baffles 200, 205 than with just the second baffle 205. Particularly, the cooling airflow 245 entering the intake openings 225, 230 with the first and second baffles 200, 205 present is 11.5 CFM. Additionally, the cooling airflow 245 exiting the first and second exhaust openings 235, 240 with the first and second baffles 200, 205 present is 5.8 and 5.7 CFM respectively.

TABLE 1

| Cooling Airflow - Cubic Feet per Minute (CFM) | | | |
|---|---|---|---|
| | Measured at Intake Openings 225, 230 | Measured at Exhaust Opening 235 | Measured at Exhaust Opening 240 |
| Only Second Baffle 205 | 7.8 | 3.8 | 4 |
| First and Second Baffles 200, 205 | 11.5 | 5.8 | 5.7 |

Although the invention has been described in detail with reference to certain embodiments above, variations and modifications exist within the scope and spirit of one or more independent aspects of the invention as described.

What is claimed is:

1. A circular saw comprising:
   a blade guard;
   a saw blade at least partially enclosed within the blade guard, the saw blade has an outer diameter that is greater than 6 inches;
   a motor housing coupled to the blade guard;
   a brushless electric motor supported within the motor housing;
   a battery pack for providing power to the brushless electric motor;
   a cover removably coupled to the blade guard, the cover including an inner wall and an outer wall defining a storage receptacle therebetween in which debris is collected during a cutting operation; and
   a rib positioned within a gap between the blade guard and the inner wall of the cover to prevent debris from falling out while travelling to the storage receptacle.

2. The circular saw of claim 1, wherein the battery pack has a nominal voltage less than 20 volts.

3. The circular saw of claim 2, wherein the battery pack is configured to output at least 100 amperes of current to the brushless electric motor.

4. The circular saw of claim 3, wherein the battery pack is configured to provide a power output of at least 1,800 watts.

5. The circular saw of claim 1, wherein the brushless electric motor has an output shaft with a pinion, the output shaft defining a motor rotation axis;
   wherein the circular saw further includes a drive gear with a drive axis that is parallel with the motor rotation axis, the drive gear is coupled to an arbor to which the saw blade is clamped to for rotation; and
   wherein the brushless electric motor is configured to rotate the output shaft as the pinion interfaces with the drive gear.

6. The circular saw of claim 5, wherein the drive axis also defines a rotational axis of the saw blade.

7. The circular saw of claim 6, wherein the saw blade is driven by the brushless electric motor to rotate within a range of 3,500 revolutions per minute and 4,000 revolutions per minute.

8. The circular saw of claim 1, wherein the brushless electric motor is operable at a maximum speed that is greater than 15,000 revolutions per minute.

9. The circular saw of claim 1, wherein the outer diameter of the saw blade is greater than 8 inches.

10. The circular saw of claim 1, wherein the saw blade is configured to cut metal.

11. The circular saw of claim 1, wherein the blade guard defines an exhaust chamber and the brushless electric motor includes a fan having a base plate and a plurality of blades extending from the base plate, and wherein the circular saw further includes a first baffle positioned adjacent the fan and a second baffle positioned radially outward of the fan, the first baffle is in facing relationship with the base plate.

12. The circular saw of claim 11, wherein a cooling airflow is axially induced by the fan through the brushless electric motor in response to activation of the brushless electric motor, the fan is configured to redirect the cooling airflow in a radial direction against the second baffle, and wherein the second baffle is configured to redirect the cooling airflow in an axial direction toward the exhaust chamber in the blade guard.

13. The circular saw of claim 12, wherein the plurality of blades are located between the base plate and the first baffle.

14. The circular saw of claim 12, wherein the brushless electric motor includes a case, and wherein the second baffle extends between the case and the blade guard.

15. The circular saw of claim 12, wherein the blade guard includes an exhaust opening, and wherein the cooling airflow is exhausted to atmosphere through the exhaust opening.

16. The circular saw of claim 15, wherein the motor housing includes an inlet opening, and wherein the cooling airflow is drawn into the motor housing through the inlet opening.

17. The circular saw of claim 12, wherein the circular saw further includes a circuit board positioned within the cooling airflow.

18. The circular saw of claim 1, wherein the rib is one of a plurality of ribs, and wherein the plurality of ribs includes radial ribs and a horizontal rib.

19. The circular saw of claim 1, wherein the rib is disposed on the blade guard.

20. A circular saw comprising:
a blade guard;
a saw blade at least partially enclosed within the blade guard;
a motor housing coupled to the blade guard;
an electric motor supported within the motor housing, the electric motor includes an output shaft that is operable at a maximum speed greater than 15,000 revolutions per minute;
a battery pack for providing power to the electric motor, the battery pack has a nominal voltage up to 20 volts and is configured to output at least 100 amperes of current to the electric motor to provide a power output of at least 1,800 watts;
a cover removably coupled to the blade guard, the cover including an inner wall and an outer wall defining a storage receptacle therebetween in which debris is collected during a cutting operation; and
a rib positioned within a gap between the blade guard and the inner wall of the cover to prevent debris from falling out while travelling to the storage receptacle.

21. The circular saw of claim 20, wherein the saw blade has an outer diameter that is greater than 6 inches.

22. The circular saw of claim 20, wherein the blade guard defines an exhaust chamber and the electric motor includes a fan, and wherein the circular saw further includes a first baffle and a second baffle that direct airflow from the fan to the exhaust chamber.

23. The circular saw of claim 20, wherein the rib is one of a plurality of ribs, and wherein the plurality of ribs includes radial ribs and a horizontal rib.

24. The circular saw of claim 20, wherein the rib is disposed on the blade guard.

* * * * *